United States Patent [19]

Weaver et al.

[11] Patent Number: 4,882,412

[45] Date of Patent: Nov. 21, 1989

[54] POLYESTER POLYMER CONTAINING THE RESIDUE OF THE UV ABSORBING BENZOPYRAN COMPOUND AND SHAPED ARTICLES PRODUCED THEREFROM

[75] Inventors: Max A. Weaver; Clarence A. Coates, Jr.; Wayne P. Pruett, all of Kingsport; Samuel D. Hilbert, Jonesborough, all of Tenn.

[73] Assignee: Eastman Kodak Company, Rochester, N.Y.

[21] Appl. No.: 287,815

[22] Filed: Dec. 21, 1988

Related U.S. Application Data

[63] Continuation-in-part of Ser. No. 126,315, Nov. 30, 1987, abandoned.

[51] Int. Cl.$^4$ .............................................. C08G 5/15
[52] U.S. Cl. ................... 528/190; 528/170; 528/172; 528/173; 528/174; 525/437; 525/448
[58] Field of Search ............... 524/110; 528/288, 289, 528/190, 170, 172, 173, 174; 525/437, 448

[56] References Cited

U.S. PATENT DOCUMENTS

| | | | |
|---|---|---|---|
| 2,680,746 | 6/1954 | Schappi | 524/110 |
| 2,680,747 | 6/1954 | Williams et al. | 549/280 |
| 2,686,170 | 8/1954 | Best | 524/110 |
| 3,148,163 | 9/1964 | Freyermuth | 524/110 |
| 3,200,086 | 8/1965 | Coleman | 525/437 |
| 3,213,058 | 10/1965 | Boyle et al. | 528/73 |
| 3,351,482 | 11/1967 | Raice | 549/289 |
| 3,533,730 | 10/1970 | Voltz et al. | 8/927 |
| 3,704,302 | 11/1972 | Enomoto et al. | 544/289 |
| 3,801,730 | 4/1974 | Scheuermann et al. | 549/404 |
| 3,910,912 | 10/1975 | Scheuermann et al. | 544/284 |
| 3,933,847 | 1/1976 | Ohkawa et al. | 548/330 |
| 4,055,568 | 10/1977 | Patsch et al. | 548/136 |
| 4,105,665 | 8/1978 | Harnisch | 524/110 |
| 4,153,596 | 5/1979 | Oertel et al. | 525/437 |
| 4,233,410 | 11/1980 | Rody et al. | 528/73 |
| 4,338,247 | 7/1982 | Zannucci et al. | 525/437 |
| 4,347,350 | 8/1982 | Horner et al. | 528/190 |
| 4,452,811 | 6/1984 | Valle | 549/289 |

FOREIGN PATENT DOCUMENTS

| | | |
|---|---|---|
| 224592A1 | 7/1985 | Fed. Rep. of Germany . |
| 56-145946 | 11/1981 | Japan . |
| 56-151751 | 11/1981 | Japan . |
| 1388590 | 3/1975 | United Kingdom . |

*Primary Examiner*—Veronica P. Hoke
*Attorney, Agent, or Firm*—J. Frederick Thomsen; William P. Heath, Jr.

[57] ABSTRACT

Composition useful for molding into articles such as food containers, beverage bottles, cured structural plastics and the like comprising molding grade polyester such as a linear, thermoplastic polyester having reacted therewith or copolymerized therein the residue of a 7-oxy-2H-1-benzopyran-2-one compound or a 7-oxy-2H-1-benzopyran-2-imine compound, said residue absorbing radiation in the range of about 330 to 380 nm and being non-extractable from said polymer and stable under polymer formation and processing conditions.

12 Claims, No Drawings

POLYESTER POLYMER CONTAINING THE RESIDUE OF THE UV ABSORBING BENZOPYRAN COMPOUND AND SHAPED ARTICLES PRODUCED THEREFROM

This application is a continuation-in-part of our copending Application Ser. No. 126,315 filed Nov. 30, 1987 now abandoned.

This invention pertains to novel polyester polymers wherein one or more benzopyran moieties have been incorporated in the chain or backbone of the polymer. This invention also pertains particularly, to containers, such as those suitable for packaging beverages and foods, manufactured from our novel condensation polymers.

Many products such as certain fruit juices, soft drinks, wines, food products, cosmetics and shampoos are deleteriously affected, i.e., degraded, by ultraviolet (UV) light when packaged in clear plastic containers which pass significant portions of the available light at wavelengths in the range of approximately 250 to 390 nm. Polyesters commonly used in the manufacture of packaging materials such as poly(ethylene terephthalate) typically absorb ultraviolet radiation of wavelengths up to about 320 nm. Thus, effective UV screening agents should absorb a substantial amount, e.g., up to about 90%, of ultraviolet light up to 390 nm, especially up to about 370 nm.

It is well known that polymers can be rendered resistant to degradation by UV light by physically blending in such polymers various UV light stabilizers such as benzophenones, benzotriazoles and resorcinol monobenzoates. See, for example, Plastics Additives Handbook, Hanser Publishers, Library of Congress, Catalog No. 83-062289, pp 128–134. Normally, such stabilizers are used in a weight concentration of at least 0.5 percent. Although these stabilizers generally function well to absorb radiation in the range of about 300 to 350 nm, absorbance in the range of 350 to 400 nm is not adequate to protect comestibles subject to UV light degradation packaged in clear plastic, i.e., essentially colorless, transparent plastics. Typical benzopyran compounds which are not suitable as UV screening agents for packaging materials because of their insufficient absorption of ultraviolet light over the necessary range are disclosed in U.S. Pat. Nos. 2,680,746, 4,347,350 and 4,452,811 and Japanese Patent 56-145,946. The stabilizers present in many of the known stabilized polymer compositions can be extracted from the polymer by solvents such as acids, alcohols and the like present in foods or beverages packaged within the stabilized polymers. Furthermore, many compounds used to stabilize polymers are not stable at high temperatures and decompose under the conditions at which polyesters are manufactured or processed. Decomposition of such stabilizers frequently causes yellow discoloration of the polymer and results in the polymer containing little, if any, of the stabilizer. U.S. Pat. Nos. 2,680,747, 3,148,163 and 4,105,665 disclose various compounds having a benzopyran nucleus which are not suitable for reacting with or copolymerizing into linear, thermoplastic polyesters due to their lack of thermal stability at the high temperatures at which such polyesters are prepared.

U.S. Pat. No. 3,634,320 discloses certain bismethine compounds and their use as UV absorbers in various addition and condensation polymers. The patent does not specify that the bis-methine compounds react or copolymerize with any of the condensation polymers disclosed. The bis-methine compounds were intended for use as stabilizers in concentrations in the polymer of up to 5%, preferably in the range of 0.1% to 0.2%.

U.S. Pat. Nos. 4,305,719, 4,338,247, 4,430,718 and 4,617,374 disclose the concept of reacting benzylidene-type methine compounds capable of absorbing UV light with or into polyesters. These patents do not, however, disclose the use of the benzopyran compounds described hereinafter to obtain the compositions provided by this invention.

The novel polymer composition provided by our invention comprises molding grade condensation polymer having copolymerized therein or reacted therewith the residue of certain 7-oxy-2H-1-benzopyran-2-one compounds or 7-oxy-2H-1-benzopyran-2-imine compounds, said residue absorbing radiation in the range of about 330 to 380 nm and being non-extractable from said polymer and stable under the polymer processing conditions. The UV light-absorbing benzopyran residues also have high extinction coefficients and absorb 90% or more of ultraviolet light of wavelengths up to about 370 nm. Furthermore, the residues of the benzopyran compounds described herein are essentially colorless and thus they can be used as UV screening agents in untinted packaging materials.

The aforesaid residue of the 7-oxy-2H-1-benzopyran-2-one compounds or 7-oxy-2H-1-benzopyran-2-imine compounds are derived from compounds which bear at least one group or substituent that is reactive with one of the monomers from which the polyester polymer is derived. The reactivity of the benzopyran compound resulting from the presence thereon of one or more reactive substituents also enables the compounds to react with a prepolymer or polymer derived from the monomers. The precursors of the residues having one reactive group react at the terminal of the polymer chain and thus function as chain terminating agents. When the precursor compounds contain two reactive groups, the compounds function as monomers, and thus are copolymerized within the polymer chain.

The amount of the benzopyran residue present in the condensation polymer compositions typically may be in the range of about 10 to 100,000 ppm by weight per million parts by weight polymer. The residue may be derived from one or a plurality of the benzopyran compounds specified hereinbelow.

The benzopyran compounds useful in preparing the novel polyester compositions provided by this invention have the formula

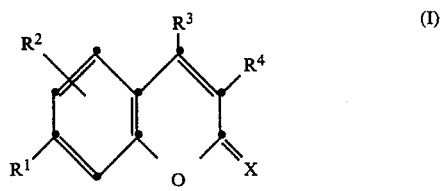
(I)

wherein
R$^1$ is hydroxy, —O—R$^5$ or

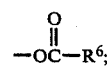

R$^2$ is hydrogen, alkyl, —O—R$^5$, or halogen;

$R^3$ is hydrogen, an aryl radical or an alkyl radical, or

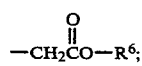

$R^4$ is cyano,

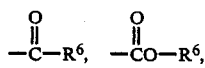

carbamoyl,

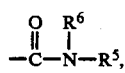

—$SO_2$—$R^5$, or a carbaocyclic or heterocyclic aryl radical; and

X is oxo or imino;
wherein
$R^5$ is alkenyl or an alkyl, cycloalkyl or aryl radical; and
$R^6$ is hydrogen or an alkyl, cycloalkyl or aryl radical; provided the benzopyran compound bears at least one substituent that is reactive with one of the monomers from which the condensation polymer is derived, said benzopryan residue absorbing radiation in the range of about 330 to 380 nm and being non-extractable from said polymer and stable under the polymer processing conditions.

The alkyl radicals represented by $R^5$ and $R^6$ can be unsubstituted or substituted alkyl of up to about 12 carbon atoms, preferably up to about 8 carbon atoms. Examples of the unsubstituted alkyl radicals include methyl, ethyl, propyl, butyl, isobutyl, pentyl, hexyl, octyl, 2-ethylhexyl, decyl, dodecyl, and isomers thereof. Examples of the substituents which may be present on the substituted alkyl radicals include hydroxy, alkoxy, hydroxyalkoxy, alkylthio, hydroxyalkylthio, halogen such as chloro or bromo; cyano; carboxylic acyloxy, e.g., groups having the formula

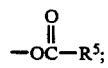

alkylsulfonyl; cycloalkylsulfonyl; arylsulfonyl; vinylsulfonyl; carboxylic acylamido, e.g., groups having the formula

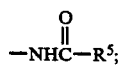

acrylamido; sulfonic acylamido, e.g., groups having the formula —$N(R^6)SO_2$—$R^5$; alkoxycarbonyl; cycloalkoxycarbonyl; aryloxycarbonyl; alkoxycarbonylamino; cycloalkoxycarbonylamino; aryloxycarbonylamino; carboxy; carbamoyl; N-substituted carbamoyl, e.g., groups having the formula

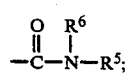

sulfamoyl; N-substituted sulfamoyl, e.g., groups having the formula

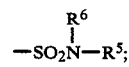

carbamic acid acyloxy, e.g., groups having the formula

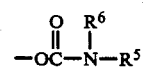

and alkoxycarbonyloxy. The alkyl radicals also may be substituted with aryl, alkoxycarbonylaryl, chlorocarbonylaryl, N-(hydroxyalkyl)carbamoylaryl, N-(hydroxyalkyl)sulfamoylaryl, aryloxy, alkoxycarbonylaryloxy, arylthio, cycloalkyl, cycloalkoxy and cycloalkylthio wherein the aryl and cycloalkyl radicals are defined hereinbelow. Additional examples of the substituents which may be present on the alkyl radicals represented by $R^5$ and $R^6$ are imide groups having the formula

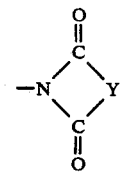

wherein Y represents the residue of a dicarboxylic acid such as, for example, ethylene; ethylene substituted with hydroxy, alkoxy, alkanoyloxy or halogen, 1,3-propanediyl, 1,2-cyclohexylene, 1,2-tetrahydrophenylene, 1,2-phenylene, or 1,2-phenylene substituted with carboxyl, alkyl, alkoxy, or halogen. Y also may represent —NH—$CH_2$—, —N(alkyl)—$CH_2$—, —O—$CH_2$—, —S—$CH_2$—, or —$CH_2$—O—$CH_2$—. Alkyl radicals $R^5$ and $R^6$ also may be substituted with 2-pyrrolididono or groups having the structure

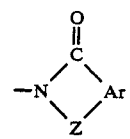

wherein Ar is an o-arylene radical, e.g., unsubstituted or substituted o-phenylene and Z is —$CH_2$— or —$SO_2$—.

The substituents which may be present on the substituted alkyl groups also include heterocyclic thio groups, e.g., groups having the formula —S—Het wherein Het is a heterocyclic aryl radical such as unsubstituted and substituted pyridyl, pyrimidinyl, pyrolyl, quinolyl, thienyl, furanyl, benzoxazolyl, benzimidazolyl, benzothiazolyl, 1,3,4-thiadiazol-2-yl, 1,2,4-thiadiazol-3-yl, or triazolyl.

The cycloalkyl radicals represented by $R^5$ and $R^6$ may be unsubstituted or substituted cycloalkyl having from 5 to 7 nuclear carbon atoms. The aryl radicals represented by $R^5$ and $R^6$ may be unsubstituted or substituted carbocyclic aryl having from 6 to 10 carbon atoms. Examples of the substituents present on the substituted aryl radicals include alkyl and the substituents which can be present on the substituted alkyl radicals represented by $R^5$.

Examples of the various substituents which may be present on the benzopyran compounds, i.e., the substituents represented by $R^1$, $R^2$, $R^3$ and $R^4$ are included in the above definition of $R^5$ and $R^6$. The various alkyl groups and alkyl moiety-containing groups included in the definitions of $R^1$, $R^2$, $R^3$ and $R^4$ can contain up to about 12 carbon atoms, preferably up to about 8 carbon atoms.

The benzopyran compounds defined hereinabove bear at least one group or substituent that is reactive with one of the monomers from which the condensation polymer is derived. The reactivity of the benzopyran compound resulting from the presence thereon of one or more substituents also renders the compounds reactive with a prepolymer or a polymer derived from the monomers. The benzopyran compounds having one reactive group react at the terminus of the polymer chaim and thus function as chain terminating agents. When the benzopyran compound contains two reactive groups, the compound will function as a monomer and thus be copolymerized within the polymer chain. Examples of the requisite reactive groups include hydroxy, ester groups such as carboxylic acyloxy, e.g., groups having the formula

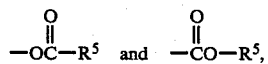

alkoxycarbonyloxy, and carbamic acyloxy, e.g., groups having the formula

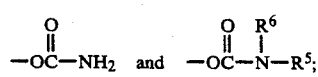

carboxy; and carboxylic acid halides such as carbonyl chloride.

The preferred reactive benzopyran compounds have the formula

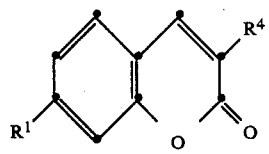

wherein $R^1$ is hydroxy, hydroxyalkoxy, alkanoyloxyalkoxy, alkoxycarbonylalkoxy or alkoxycarbonylphenylalkoxy; and $R^4$ is alkoxycarbonyl, arylsulfonyl, cyano, 2-benzoxazolyl, 2-benxzothiazolyl or 2-benzimidazolyl;

wherein each alkyl group and alkyl moiety contains up to 6 carbon atoms and each aryl group is phenyl or phenyl substituted with alkyl of up to 4 carbon atoms or halogen.

As stated hereinabove, the benzopyran compounds must bear or contain at least one substituent that is reactive with one of the monomers from which the condensation polymer is derived. Examples of such reactive substituents include carbonyl halides such as carbonyl chloride, carboxy, alkoxycarbonyl, alkenyloxycarbonyl, cycloalkoxycarbonyl, aryloxy-carbonyl, amino, hydroxy, esterified hydroxy, i.e., acyloxy, groups such as carboxylic acid esters, e.g., alkanoyloxy, cycloalkanoyloxy and aroyloxy, carbamic acid esters, e.g., N-alkyl-carbamoyloxy and N-arylcarbamoyloxy and carbonate esers, e.g., ethoxycarbonyloxy. The benzopyran residue may be incorporated into or on the polymer chain by reacting one or more benzopyran compounds of formula (I) with the monomers, with a prepolymer or with the final polymer. As those skilled in the art will appreciate, when the reactive substituent or substituents are alkoxycarbonyl, alkenyloxycarbonyl, cycloalkoxycarbonyl, aryloxycarbonyl,or acyloxy, the alkyl, alkenyl, cycloalkyl and aryl residues and the acid residues of the acyloxy substituents are displaced or removed from the benzopyran compound upon reaction with the polymer or polymer precursor. Thus, those residues are not important to the benzopyran residue component of our novel compositions.

The benzopryan compounds of formula (I) can be prepared according to published procedures or variations thereof which are readily apparent to those skilled in the art. For example, the benzopyran compounds may be synthesized from salicylaldehydes (III) by the Perkin Reaction (Johnson, Organic Reactions, John Wiley and Sons, New York, 1942, Vol. 1, p. 210), e.g.:

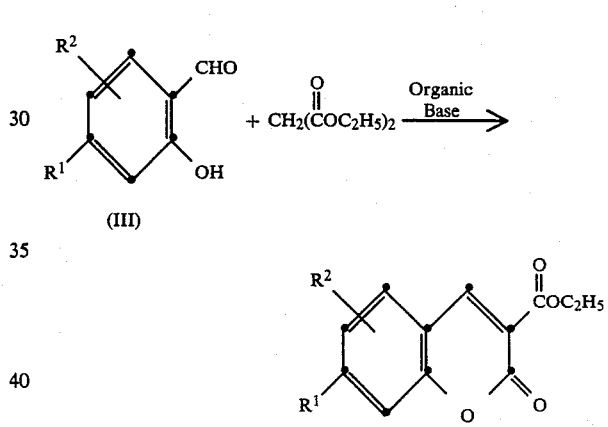

Additional references pertaining to the preparation of coumarins and iminocoumarins include The Chemistry of Coumarins, S. Sethna and N. M. Shan, Chem. Rev., 36, 1; Coumarins, Heterocyclic Compounds, ed. R. C. Elderfield, Vol 2, p. 173; Coumarin and Its Derivatives, Chemistry of Carbon Compounds, C. H. Rodd, Vol IVB, p. 869; and U.S. Pat. Nos. 4,055,568, 4,018,796, 3,933,847, 3,910,912, 3,801,602, 3,704,302 and 3,533,730.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding grade and have an inherent viscosity (I.V.) of about 0.4 to about 1.2. The preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4- butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The linear polyesters may be prepared according to procedures well known in the art. For example, a mixture of one or more dicarboxylic acids, preferably aromatic dicarboxylic acids, or ester forming derivatives thereof, and one or more diols may be heated in the presence of esterification and/or poly-esterification catalysts at temperatures in the range of 150° to 300° C. and pressures of atmospheric to 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

The novel polyester compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g mils/100 in.$^2$ -24 hours, a Carbon Dioxide Permeability of 20 to 30 cc. mils/100 in.$^2$ -24 hours -atm., and an Oxygen Permeability of 4 to 8 cc. mils/100 in.$^2$ -24 hours -atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk Riber, Minnesota, and the Carbon Dioxide Permeability by the standard operating procedure of a MOCON PERMATRAN C II, also of Modern Controls.

The concentration of the residue of the benzopyran compound in the condensation polymer can be varied substantially depending, for example, on the intended function of the UV-absorbing residue and/or the end use for which the polyester composition is intended. When the composition is to be used in the fabrication of relatively thin-walled containers to screen UV light in the range of about 330 to 380 nm, the concentration of the residue of the benzopyran compound normally will be in the range of about 50 to 1500 ppm (parts by weight per million parts by weight polymer) with the range of about 200 to 800 ppm being especially preferred.

Polyester compositions containing substantially higher amounts, e.g., from about 2.0 to 10.0 weight percent, of the residue of one or more of the benzopyran compounds described herein may be used as polymer concentrates. Such concentrates may be blended with the same or different polymer according to conventional procedures to obtain polymer compositions which will contain a predetermined amount of the residue or residues in a nonextractable form. In the preparation of these highly loaded, polymer composition concentrates the residue preferably is divalent and thus is derived from a difunctional benzopyran compound such as the compound of Example 2.

The preparation of the benzopyran compounds and their use in preparing the compositions of our invention are further illustrated by the following examples:

EXAMPLE 1

A mixture of 2,4-dihydroxybenzaldehyde (2.76 g, 0.02 mol), diethylmalonate (3.52 g, 0.022 mol), ethanol (15 mL), piperidine (10 drops) and acetic acid (5 drops) is heated at reflux for 5.0 hours and then allowed to cool. Water (20.0 mL) is added, followed by 10% HCl (5.0 mL). After being stirred for about 0.5 hours the reaction mixture is filtered. The product (2.0 g) is washed with 50:50 ethanol:water and then dried in air. Mass spectroscopy analysis confirms the product is ethyl 7-hydroxy-2-oxo-2H-1-benzopyran-3-carboxylate having the structure:

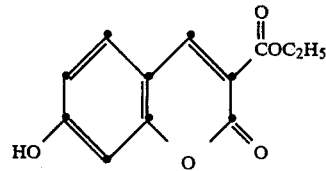

In methylene chloride, an absorption maximum ($\lambda$ max) is observed at 343 nm and the compound has a blue-white fluorescence when viewed under UV light.

EXAMPLE 2

A mixture of ethyl 7-hydroxy-2-oxo-2H-1-benzopyran-3-carboxylate (1.0 g, 0.0043 mol) from Example 1, 4-(methoxycarbonyl)benzyl chloride (1.84 g, 0.01 mol) N,N-dimethylformamide (15.0 mL), and potassium carbonate (1.4 g) is heated and stirred for 2 hours at 100° to 105° C. The initial yellow color of the anion is lost as the reaction proceeds. Water (15.0 mL) is added to the cooled reaction mixture to precipitate the product, which is collected by filtration, washed with water, and then reslurried in hot isopropanol. After being allowed to cool, the product is filtered, washed with isopropanol and dried in air to yield 1.0 g of product which mass spectroscopy analysis confirms is ethyl 7-[[4-(methoxycarbonyl)phenyl]methoxy]-2-oxo-2H-1-benzopyran-3-carboxylate having the structure:

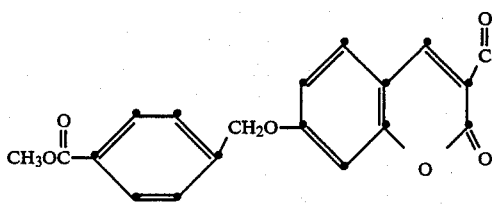

The product has an absorption maximum (λ max) at 346 nm and has a bright blue-white fluorescence under UV light.

EXAMPLE 3

Ethyl 7-hydroxy-2-oxo-2H-1-benzopyran-3-carboxylate (1.0 g, 0.0043 mol) is alkylated with ethyl bromoacetate (1.67 g, 0.01 mol) under the same conditions described in Example 2 and the product isolated and purified in the same manner. Mass spectroscopy analysis confirms the product is ethyl 7-(2-ethoxy-2-oxoethoxy)-2-oxo-2H-1-benzopyran-3-carboxylate having the structure:

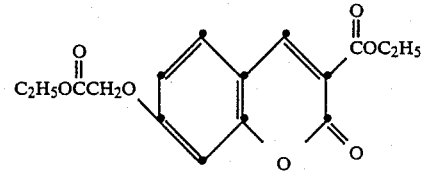

In methylene chloride, the product has an absorption maximum (λ max) at 342 nm and has a blue-white fluorescence under UV light.

EXAMPLE 4

A mixture of 2,4-dihydroxybenzaldehyde (2.76 g, 0.02 mol), ethyl α-(2-benzoxazolyl)acetate (4.10 g, 0.02 mol), ethanol (20.0 mL), piperidine (12 drops), and acetic acid (6 drops) is heated at reflux for 1 hour and then allowed to cool. The crystallized product is collected by filtration, washed with 10% HCl and then washed with water and dried. The yield is 4.1 g (74% of theoretical) of 3-(2-benzoxazolyl)-7-hydroxy-2H-1-benzopyran-2-one product which has the structure as confirmed by mass spectroscopy analysis:

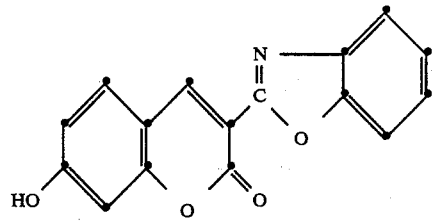

In methylene chloride the compound has an absorption maximum (λ max) at 367 nm and has an intense fluorescence under UV light.

Tables I describes additional benzopyran compounds which may be used in the preparation of the novel polymer compositions provided by our invention. These compounds may be prepared according to the procedures described in the preceding examples or techniques analogous thereto.

TABLE I

| Example | R⁸ | R² | R³ | R⁴ | X |
|---|---|---|---|---|---|
| 5 | —CH₂COOC₂H₅ | H | H | —COOH | O |
| 6 | —CH₂COOCH₃ | H | H | —COOCH₃ | O |
| 7 | —CH₂COOC₂H₅ | H | H | —CN | O |
| 8 | —CH₂CH₂OH | H | H | —COOCH₂CH₂OH | O |
| 9 | —CH₂CH₂COOC₂H₅ | H | H | —COOC₂H₅ | O |
| 10 | —(CH₂)₄COOCH₃ | H | H | —CONHC₂H₅ | O |
| 11 | —CH₂CH₂COOH | H | H | —CONH₂ | O |
| 12 | —(CH₂)₃OOCCH₃ | H | H | —CON(C₂H₅)₂ | O |
| 13 | H | H | H | —CONHCH₂CH₂OH | O |
| 14 | H | H | H | —SO₂CH₃ | O |
| 15 | H | H | H | —SO₂C₆H₅ | O |
| 16 | H | H | H | —SO₂C₆H₄—4-Cl | O |
| 17 | —CH₂CH₂COOC₂H₅ | H | H | —SO₂C₆H₄—4-NHCOCH₃ | O |
| 18 | —CH₂COOC₂H₅ | H | H | —SO₂C₆H₄—4-CH₃ | NH |
| 19 | —CH₂COOC₂H₅ | H | H | —C=NN=C(C₆H₅)—O⎤ | NH |
| 20 | —CH₂COOC₂H₅ | H | H | —C=N—o-C₆H₄—O⎤ | O |
| 21 | —CH₂COOC₂H₅ | H | H | —C=N—o-C₆H₄—S⎤ | NH |
| 22 | H | H | H | —COC₆H₅ | O |
| 23 | H | H | H | —C=CHCH=C(COOC₂H₅)—S⎤ | O |
| 24 | —CH₂COOC₂H₅ | H | H | —C=NN=C(C₆H₅)—S⎤ | O |
| 25 | —CH₂COOCH₃ | H | H | —C=NN=C(CH₃)—S⎤ | O |

TABLE I-continued

| Example | R⁸ | R² | R³ | R⁴ | X |
|---|---|---|---|---|---|
| 26 | —CH₂COOCH₃ | H | H | —C=NN=C(COOCH₃)₂→O | O |
| 27 | —CH₂COOCH₃ | H | H | —C₆H₄—4-CN | O |
| 28 | —CH₂COOCH₃ | H | H | —C₆H₄—4-COOCH₃ | O |
| 29 | —CH₂C₆H₄—4-COOCH₃ | H | H | —C=N—o-C₆H₄—O | O |
| 30 | —CH₂C₆H₄—4-COOH | H | H | —COOH | O |
| 31 | —C₆H₄COOCH₃ | H | H | —COOCH₃ | O |
| 32 | —CH₂CH₂OCH₂CH₂OH | H | H | —COOC₂H₅ | O |
| 33 | —CH₂CH₂C₆H₄—4-COOC₂H₅ | H | H | —C=N—o-C₆H₄—NH | O |
| 34 | —CH₂CH(OH)CH₂OH | H | H | —CN | O |
| 35 | —CH₂COOC₂H₅ | H | H | —C=N—o-C₆H₄—C(O)—NH | O |
| 36 | —CH₂CH₂NC(O)—o-C₆H₄—C(O) | H | H | —COOCH₃ | O |
| 37 | —CH₂COOCH₂CH₂CN | H | H | —SO₂CH₃ | O |
| 38 | —CH₂CH₂NHCOCH₃ | H | H | —COOC₂H₅ | O |
| 39 | —CH₂C₆H₅ | H | —CH₃ | —COOC₂H₅ | O |
| 40 | H | 6-CH₃ | H | —CON(CH₃)CH₂CH₂OH | O |
| 41 | —CH₂CH₂OH | H | H | —COC₆H₄—4-COOCH₃ | O |
| 42 | H | H | H | —COC(CH₃)₃ | O |
| 43 | —CH₂COOCH₃ | H | H | —COC(CH₃)₃ | NH |
| 44 | —CH₂COOCH₃ | H | H | —C=N—o-C₆H₃—5-Cl—O | NH |
| 45 | —CH₃ | H | H | —COOC₂H₅ | O |
| 46 | —(CH₂)₃CH₃ | H | H | —COOH | O |

TABLE I-continued

| Example | R⁸ | R² | R³ | R⁴ | X |
|---|---|---|---|---|---|
| 47 | —C₆H₁₁ | H | H | —COOCH₃ | O |
| 48 | —CH₂C₆H₁₁ | H | H | —COOCH(CH₃)₂ | O |
| 49 | —CH₂C₆H₄—4-CH₃ | H | H | —COOC₆H₁₁ | O |
| 50 | —CH₂C₆H₄—4-Cl | H | H | —COOCH₂C₆H₁₀—4-CH₂OH | O |
| 51 | —CH₂C₆H₁₀—4-CH₃ | H | H | —COOCH₂OCH₃ | O |
| 52 | —CH₂CH₂OC₆H₅ | H | H | —COOCH₂CH₂Cl | O |
| 53 | —CH₂CH₂OC₂H₅ | H | H | —COOCH₂CH₂OC₂H₅ | O |
| 54 | —CH₂CH₂OOCCH₃ | H | H | —COOCH₂CH₂OOCCH₃ | O |
| 55 | —(CH₂CH₂O)₂C₂H₅ | H | H | —COO(CH₂CH₂O)₂C₂H₅ | O |
| 56 | —CH₂CH₂SCH₂CH₂OH | H | H | —COOCH₂CH₂SCH₂CH₂OH | O |
| 57 | —CH₂CH₂SO₂CH₃ | H | H | —COOC₂H₅ | O |
| 58 | —CH₂CH₂OOCNHC₆H₅ | H | H | —COOC₂H₅ | O |
| 59 | —CH₂CH₂OOCNHCH₃ | H | H | —C=N—o-C₆H₃—5-Cl—O | O |
| 60 | —CH₂CH₂N(CH₃)SO₂CH₃ | H | H | —C=N—o-C₆H₃—6-COOC₂H₅—O | O |
| 61 | —CH₂CH=CH₂ | H | H | —COOCH₂CH=CH₂ | O |
| 62 | —CH₂CH₂CN | H | H | —COOCH₂CH₂CN | O |
| 63 | —CH₂CH₂N(SO₂CH₃)CH₂CH₂OH | H | H | —COOC₂H₅ | O |
| 64 | —CH₂CH₂OCOOC₂H₅ | H | H | —COOCH₂CH₂OCOOC₂H₅ | O |
| 65 | —CH₂CH₂SO₂CH₂CH₂OH | H | H | —COOCH₂CH₂NHCOCH₃ | O |
| 66 | —CH₂CH₂SCH₃ | H | H | —COO(CH₂CH₂O)₂C₂H₅ | O |
| 67 | —CH₂CH₂NHSO₂CH₃ | H | H | —COOC₆H₄—4-CH₃ | O |
| 68 | —CH₂CH₂NCOCH₂CH₂CO | H | H | —COOC₂H₅ | O |
| 69 | —CH₂CH₂N(CH₂)₃CO | H | H | —COOC₂H₅ | O |
| 70 | —CH₂CH₂NCO—o-C₆H₄SO₂ | H | H | —COOC₂H₅ | O |

TABLE I-continued

| Example | $R^8$ | $R^2$ | $R^3$ | $R^4$ | X |
|---|---|---|---|---|---|
| 71 | —CH$_2$CH$_2$NCH$_2$—o-C$_6$H$_4$CO— | H | H | —COOC$_2$H$_5$ | O |
| 72 | —CH$_2$CH$_2$NCO—o-C$_6$H$_3$—4-COOH—CO— | H | H | —COOH | O |
| 73 | —CH$_2$CH$_2$NCOCH$_2$NHCO— | H | H | —COOC$_2$H$_5$ | O |
| 74 | —CH$_2$CH$_2$NCOCH(OH)CH$_2$CO— | H | H | —COOC$_2$H$_5$ | O |
| 75 | —CH$_2$CH$_2$SC=N—o-C$_6$H$_4$—S— | H | H | —COOC$_2$H$_5$ | O |
| 76 | —CH$_2$CH$_2$SC=NN(CH$_2$CH$_2$OH—CH=N— | H | H | —CN | O |
| 77 | —CH$_2$CH$_2$SC=N—o-C$_6$H$_4$—O— | H | H | —COOC$_2$H$_5$ | O |
| 78 | —CH$_2$COOC$_2$H$_5$ | H | H | —C=N—o-C$_6$H$_4$—CONH— | O |
| 79 | —CH$_2$COOC$_2$H$_5$ | H | H | —C=CHNCH=CH— | O |
| 80 | —CH$_2$COOC$_2$H$_5$ | H | H | —C=CHSCH=CH— | O |
| 81 | —CH$_2$COOC$_2$H$_5$ | H | H | —C=CHN=CHCH=CH— | O |

TABLE I-continued

[Structure: chromone-type with R³, R⁴ on position with X; R² on ring; R⁸—O on ring]

| Example | R⁸ | R² | R³ | R⁴ | X |
|---|---|---|---|---|---|
| 82 | —CH₂COOC₂H₅ | H | H | —C=CH—o-C₆H₄—N=CH (bracketed) | O |
| 83 | —CH₂COOCH₂C₆H₅ | H | H | —COOCH₂C₆H₅ | O |
| 84 | CH₂COOCH₂CH₂OC₆H₅ | H | H | —COOCH₂CH₂OC₆H₅ | O |
| 85 | H | H | H | —COOCH₂C=CHCH=CHO (bracketed) | O |
| 86 | H | 6-OCH₂COOC₂H₅ | H | —CN | O |
| 87 | —CH₂COOC₂H₅ | 6-OCH₃ | —CH₃ | —COOC₂H₅ | O |
| 88 | —CH₂COOC₂H₅ | 6-OCH₂COOC₂H₅ | C₆H₅ | —COOC₂H₅ | O |
| 89 | —CH₂COOC₂H₅ | 6-CH₃ | C₆H₅ | —COO(CH₂)₃CH₃ | O |
| 90 | H | 6-Cl | —CH₃ | —COOC₂H₅ | O |
| 91 | —CH₂CH₂OH | 6-Br | —C₆H₅ | —COOCH₂CH₂OH | O |
| 92 | H | 6-C₂H₅ | —C₆H₄—4-COOCH₃ | —COOCH₃ | O |
| 93 | —CH₂COOC₂H₅ | 6-CH₃—8-OH | —C₆H₅ | —COOCH₃ | O |
| 94 | —CH₂COOC₂H₅ | 8-CH₃ | —C₆H₅ | —COOCH₃ | O |
| 95 | —CH₂COOC₂H₅ | H | —CH₃ | —COOCH₃ | O |
| 96 | —CH₂COOC₂H₅ | H | —CH₃ | —COOC₂H₅ | O |
| 97 | —CH₂COOH | | —CH₂COOH | —COOC₂H₅ | O |

EXAMPLE 98

The following materials are placed in a 500-mL, three-necked, round-bottom flask:

- 97 g (0.5 mol) dimethyl terephthalate
- 62 g (1.0 mol) ethylene glycol
- 0.00192 g Ti from a n-butanol solution of acetyltriisopropyl titanate
- 0.0053 g Mn from an ethylene glycol solution of manganese acetate
- 0.0345 g antimony trioxide
- 0.0072 g Co from an ethylene glycol solution of cobaltous acetate The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 mL of an ethylene glycol slurry of a mixed phosphorus ester composition (Zonyl A) which contains 0.012 g phosphorus is added. The temperature of the bath is increased to 230° C. At 230° C. ethyl 7[[4-(methoxycarbonyl)phenyl]methoxy]-2-oxo-2H-1-benzopyran-3-carboxylate (0.0384 g) prepared in Example 2 is added to the flask. Five minutes after this addition, a vacuum with a slow stream of nitrogen bleeding in the system is applied over a five-minute period until the pressure is reduced to 200 mm Hg. The flask and contents are heated at 230° C. under a pressure of 200 mm Hg for 25 minutes. The metal bath temperature is increased to 270° C. At 270° C. the pressure is reduced slowly to 100 mm Hg. The flask and contents are heated at 270° C. under a pressure of 100 mm Hg for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting polymer has an inherent viscosity of 0.57 measured in a 60/40 ratio by weight of phenol/tetrachloroethane at a concentration of 0.5 g per 100 mL. An amorphous 13.5-mil thick film molded from this polymer to simulate the sidewall of a container transmits less than 10% light from 250 to 351 nm whereas a 13.5-mil film prepared from a like polyester without the absorber transmits less than 10% light at all wavelengths above 320 nm.

EXAMPLE 99

The procedure described in Example 98 is repeated using 0.0384 g (400 ppm) of ethyl 7-hydroxy-2-oxo-2H-1-benzopyran-3-carboxylate of Example 1 instead of the benzopyran compound used in Example 98. The resulting polymer is white and has an inherent viscosity of 0.45. An amorphous 14.5-mil thick film molded from this polymer transmits less than 10% light from 250 to 371 nm whereas a 14.5 -mil film prepared from a like polyester without the copolymerized absorber transmits less than 10% light from 250 to only 320 nm.

EXAMPLE 100

The procedure described in Example 98 is repeated using 0.0384 g (400 ppm) ethyl 7-(2-ethoxy-2-oxoethoxy)-2-oxo-2H-1-benzopyran-3-carboxylate obtained in Example 3 instead of the benzopyran compound used in Example 98. The resulting polymer has an inherent viscosity of 0.59 measured in a 60/40 ratio by weight of phenol/tetrachloroethane at a concentration of 0.5 g per 100 mL. An amorphous 13.5-mil thick film molded from this polymer shows a strong absorption peak with a maximum at 349 nm.

EXAMPLE 101

Example 98 is repeated using 0.0384 g of 3-(2-benzoxazolyl)-7-hydroxy-2H-1-benzopyran-2-one from Example 4 instead of the UV absorbing benzopyran compound used in Example 98. The resulting polymer has an inherent viscosity of 0.53 measured in a 60/40 ratio by weight of phenol/tetrachloroethane at a concentration of 0.5 g per 100 mL. An amorphous 13.5-mil thick film molded from this polymer exhibits a strong absorption peak with a maximum at 391 nm.

EXAMPLE 102

Example 98 is repeated using 0.0384 g of 7-hydroxy-3-methylsulfonyl-2H-1-benzopyran-2-one with (Example 14) instead of the absorber used in Example 98. The resulting polymer has an inherent viscosity of 0.55 measured in a 60/40 ratio by weight of phenol/tetrachloroethane at a concentration of 0.5 g per 100 mL. An amorphous 13.5-mil thick film molded from this polymer shows a strong absorption peak with a maximum at 345 nm.

EXAMPLE 103

Example 98 is repeated using 0.0384 g of 7-hydroxy-3-benzoyl-2H-1-benzopyran-2-one from Example 22 instead of the absorber used in Example 98. The resulting polymer has an inherent viscosity of 0.56 measured as described in the preceding examples. An amorphous 13-mil thick film molded from this polyester shows a strong absorption peak with a maximum at 340 nm.

EXAMPLE 104

Example 98 is repeated using 0.0384 g of 3-cyano-7-hydroxy-2H-1-benzopyran-2-one from Example 86 instead of the benzopyran compound used in Example 98. The resulting polymer has an inherent viscosity of 0.59 measured as described in the preceding examples. As amorphous 15-mil thick film molded from this polymer exhibits a strong absorption peak with a maximum at 355 nm.

The inherent viscosities (I.V. of the copolyesters described herein are determined according to ASTM D2857-70 procedure in a Wagner Viscometer of Lab Glass Inc., of Vineland, N.J., having a ½ mL capillary bulb, using a polymer concentration of 0.5%, by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation:

$$\{\eta\}_{0.50\%}^{25°\text{ C.}} = \frac{\ln \frac{t_s}{t_o}}{C}$$

where:

$\{\eta\}$ = Inherent viscosity at 25° C. at a polymer concentration of 0.5 g/100 mL of solvent;

ln = Natural logarithm;

$t_s$ = Sample flow time;

$t_o$ = Solvent-blank flow time; and

C = Concentration of polymer in grams per 100 mL of solvent = 0.50

The nonextractabilities of the benzopyran residues described herein are determined as follows:

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 mL solvent 100 in.² surface area (2 mL/in.²).

Solvent blanks are run under the same extraction conditions without polymer. In most cases samples were extracted, spiked, with a known amount of additive as a control, and analyzed in duplicates. The solvents employed and the extraction conditions for each solvent are:

1. Water. The samples at room temperature are added to solvent and heated at 250° F. for 2 hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours. Another set of samples is aged for 30 days at 120° F. and then analyzed.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

Any suitable analytical technique and apparatus may be employed to determine the amount of benzopyran residue extracted from the polymer.

The invention has been described in detail with particular reference to preferred embodiments thereof, but it will be understood that variations and modifications can be effected within the spirit and scope of the invention.

We claim:

1. A composition comprising molding grade polyester having copolymerized therein or reacted therewith the residue of a benzopyran compound having the formula

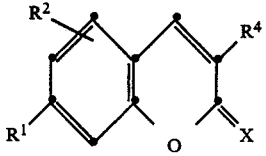

$R^1$ is hydroxy, —O—$R^5$ or

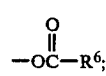

$R^2$ is hydrogen, alkyl, —O—$R^5$, or halogen;
$R^4$ is cyano,

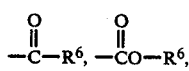

carbamoyl,

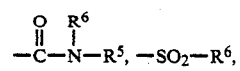

or a carbocyclic or heterocyclic aryl radical; and

X is oxo or imino;

wherein $R^5$ is alkenyl or an alkyl, cycloalkyl or aryl radical; and $R^6$ is hydrogen or an alkyl, cycloalkyl or aryl radical; provided the benzopyran compound bears at least one substituent that is reactive with one of the monomers from which the polyester is derived, said residues absorbing radiation in the range of about 330 to 380 nm and being non-extractable from said polyester and stable under the polyester processing conditions.

2. A composition according to claim 1 wherein the amount of benzopyran residue present is from about 10 to 100,000 ppm.

3. A composition according to claim 1 wherein the amount of benzopyran residue present is from about 50 to 1500 ppm.

4. A composition comprising molding or fiber grade linear polyester having copolymerized therein or reacted therewith about 200 to 800 parts by weight per million parts by weight polyester of the residue of a benzopyran compound having the formula

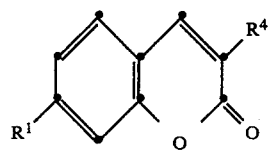

wherein $R^1$ is hydroxy, hydroxyalkoxy, alkanoyloxyalkoxy, alkoxycarbonylalkoxy or alkoxycarbonylphenylalkoxy; and $R^4$ is alkoxycarbonyl, arylsulfonyl, cyano, 2-benzoxazolyl, 2-benzothiazolyl or 2-benzimidazolyl;

wherein each alkyl group and alkyl moiety contains up to 6 carbon atoms and each aryl group is phenyl or phenyl substituted with alkyl of up to 4 carbon atoms or halogen.

5. A composition according to claim 4 wherein the benzopyran compound has the structure

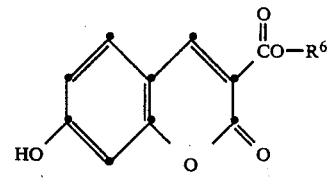

wherein $R^6$ is alkyl of up to six carbon atoms.

6. A composition according to claim 4 wherein the benzopyran compound has the structure

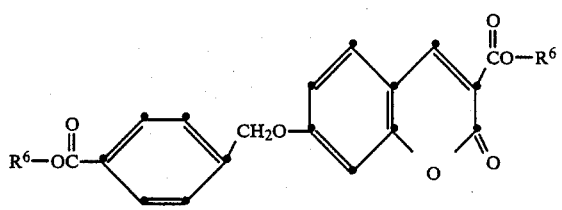

wherein each $R^6$ is alkyl of up to six carbon atoms.

7. A composition according to claim 4 wherein the benzopyran compound has the structure

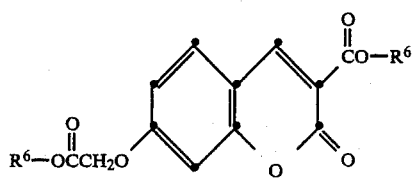

wherein each $R^6$ is alkyl of up to six carbon atoms.

8. A composition according to claim 4 wherein the benzopyran compound has the structure

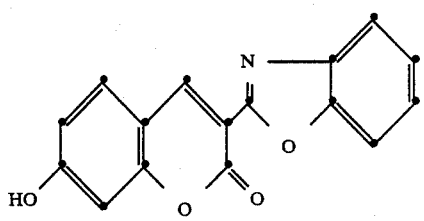

9. A composition according to claim 1 wherein the polyester is comprised of at least 50 mol percent terephthalic acid residue and the glycol residue is comprised of at least 50 mol percent ethylene glycol or 1,4-cyclohexanedimethanol and the polyester contains from about 50 to 1500 ppm of the benzopyran residue.

10. A composition according to claim 1 wherein the polyester is comprised of from about 75 to 100 mol percent terephthalic acid residue and from about 75 to 100 mol percent ethylene glycol residues and the polyester contains from about 200 to 800 ppm of the benzopyran residue.

11. A formed article of the composition of claim 1.

12. A composition comprising a linear, thermoplastic polyester having copolymerized therein a total of about 2.0 to 10.0 weight percent of the residue of a difunctional benzopyran compound of the formula set forth in claim 1.

* * * * *